United States Patent
Pujadas

(10) Patent No.: US 9,668,433 B2
(45) Date of Patent: *Jun. 6, 2017

(54) SUB-SURFACE IRRIGATION SYSTEM AND METHOD

(71) Applicant: Carlos Alfredo Pujadas, Las Vegas, NV (US)

(72) Inventor: Carlos Alfredo Pujadas, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/099,890

(22) Filed: Apr. 15, 2016

(65) Prior Publication Data

US 2016/0295817 A1 Oct. 13, 2016

Related U.S. Application Data

(60) Continuation-in-part of application No. 14/826,952, filed on Aug. 14, 2015, now Pat. No. 9,338,950, which is a division of application No. 14/681,084, filed on Apr. 8, 2015, now Pat. No. 9,137,956.

(51) Int. Cl.
*A01G 25/06* (2006.01)
*F16L 3/223* (2006.01)

(52) U.S. Cl.
CPC .............. *A01G 25/06* (2013.01); *F16L 3/223* (2013.01)

(58) Field of Classification Search
CPC ....................................... A01G 25/06
USPC ................................ 405/43, 44, 45
See application file for complete search history.

(56) References Cited

U.S. PATENT DOCUMENTS

| 2,798,768 A | 7/1957 | Benton |
| 2,909,002 A | 10/1959 | Hubert |
| 2,947,109 A | 8/1960 | Davis |
| 3,256,693 A | 6/1966 | Melvis |
| 3,302,408 A | 2/1967 | Schmid |
| 3,426,544 A | 2/1969 | Curtis |
| 3,939,875 A * | 2/1976 | Osborn .................. A01G 25/06 138/119 |

(Continued)

FOREIGN PATENT DOCUMENTS

CH 695594 * 7/2006

OTHER PUBLICATIONS

Garden in Minutes. Garden Grids. http://gardeninminutes.com/category/gardengrids/.

(Continued)

*Primary Examiner* — Frederick L Lagman
(74) *Attorney, Agent, or Firm* — Connie R. Masters

(57) ABSTRACT

An irrigation system and method is provided that includes a set of longitudinal perforated tubing members, with each tubing member having a tubing proximal end attached or attachable to a proximal lateral fluid conduit and having a tubing distal end attached attachable to a distal lateral fluid conduit to form an irrigation array. Two types of cross members are provided, a spacer cross member and a tubing cross member. The cross members hold each of the perforated tubing members in a grid-like pattern forming a tubing/spacer array or a tubing/tubing array. The longitudinal perforated tubing may be cut to accommodate the shape of a landscape format. Methods are provided for joining or ending the cut portions. The irrigation array is created, attached to a water supply, and buried below the surface of the ground.

20 Claims, 13 Drawing Sheets

(56) References Cited

U.S. PATENT DOCUMENTS

| | | | |
|---|---|---|---|
| 4,065,926 A | 1/1978 | Brandt | |
| 4,721,408 A | 1/1988 | Hewett | |
| 4,752,402 A * | 6/1988 | Gray | B01D 24/26 |
| | | | 210/747.9 |
| 5,133,622 A | 7/1992 | Hewett | |
| 5,163,781 A | 11/1992 | Husu | |
| 5,196,125 A | 3/1993 | O'Brien | |
| 5,427,473 A | 6/1995 | Todd | |
| 5,597,264 A * | 1/1997 | Laak | E03F 1/002 |
| | | | 210/170.08 |
| 5,752,784 A | 5/1998 | Motz | |
| 6,709,198 B2 | 3/2004 | Wachtel | |
| 9,137,956 B1 * | 9/2015 | Pujadas | A01G 25/06 |
| 9,338,950 B1 * | 5/2016 | Pujadas | A01G 25/06 |
| 2002/0098322 A1 | 7/2002 | Cripp | |
| 2007/0144065 A1 | 6/2007 | Lowe | |
| 2007/0189852 A1 | 8/2007 | Wolfley | |
| 2013/0074400 A1 * | 3/2013 | Roess | A01G 25/06 |
| | | | 47/21.1 |
| 2013/0183097 A1 | 7/2013 | Scantling | |

OTHER PUBLICATIONS

International Search Report Dated Aug. 16, 2016; PCT Application No. PCT/US16/26808 filed Apr. 8, 2016.
Written Opinion Dated Aug. 16, 2016; PCT Application No. PCT/US16/26808 filed Apr. 8, 2016.

* cited by examiner

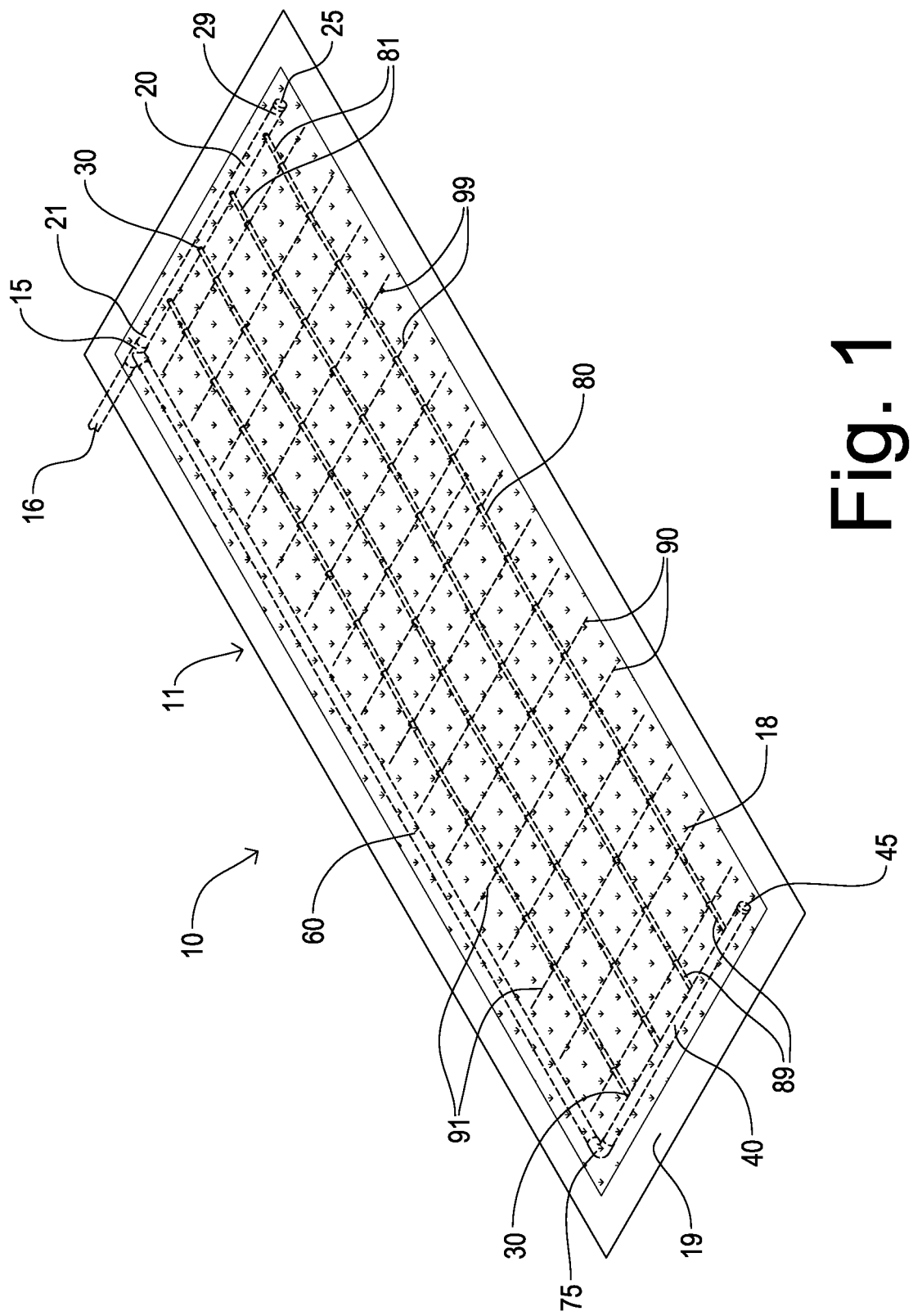

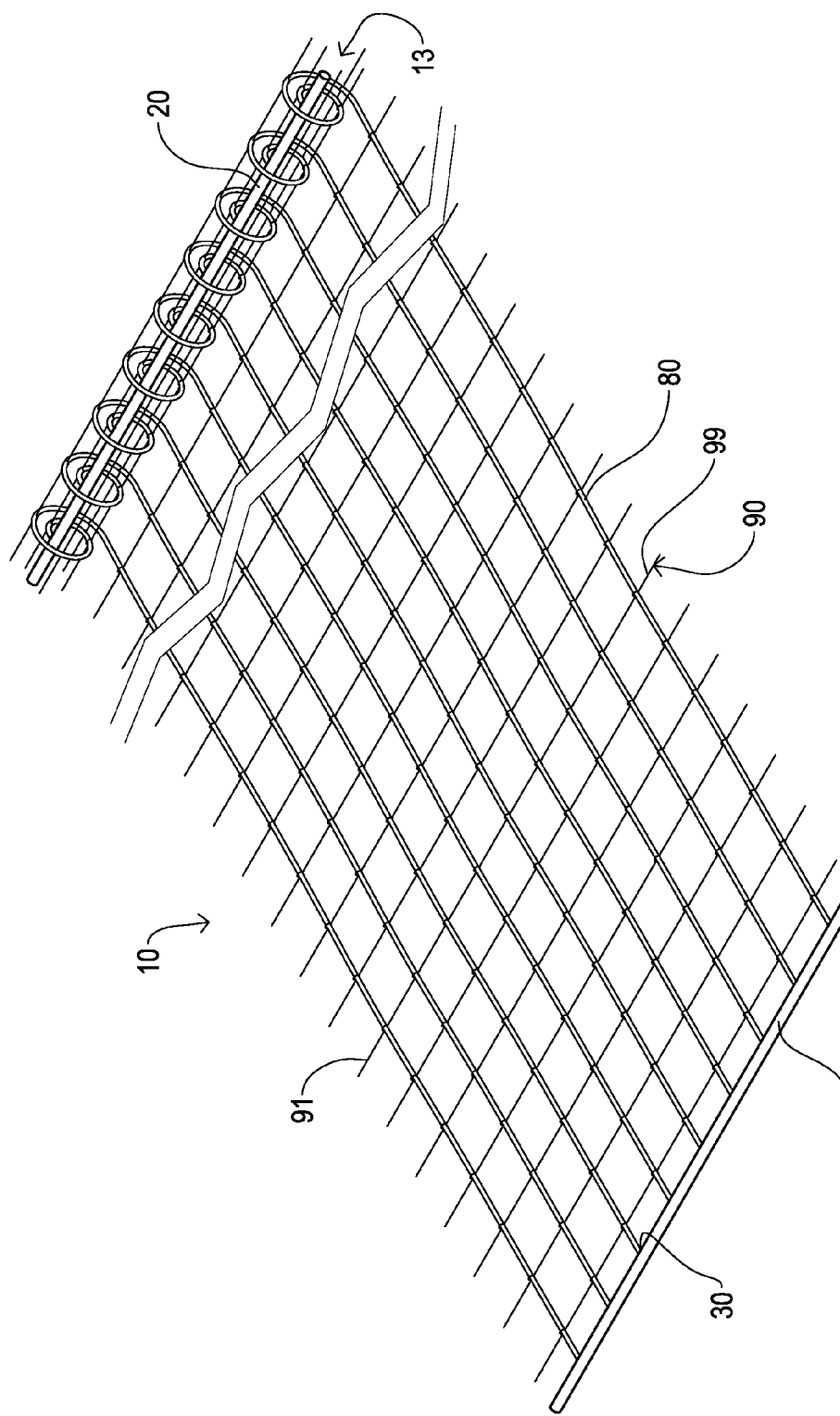

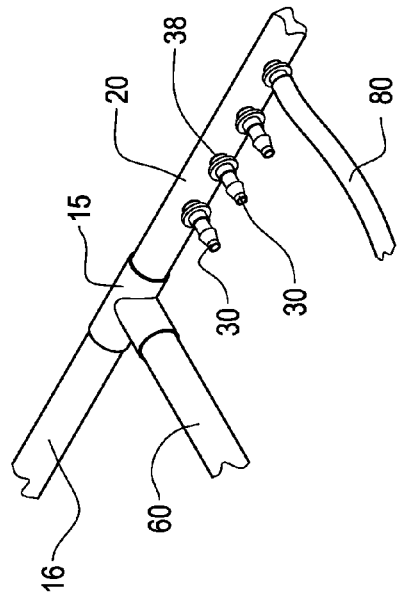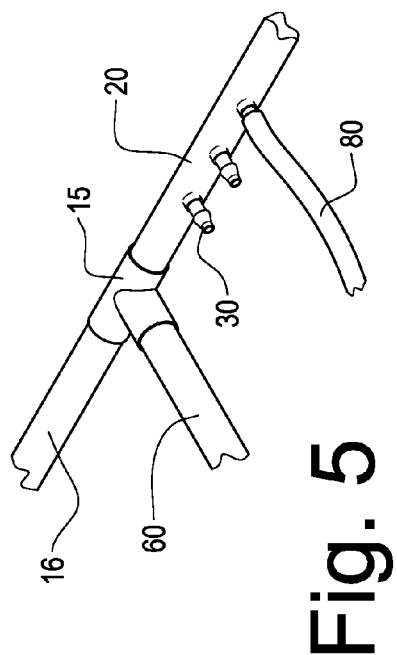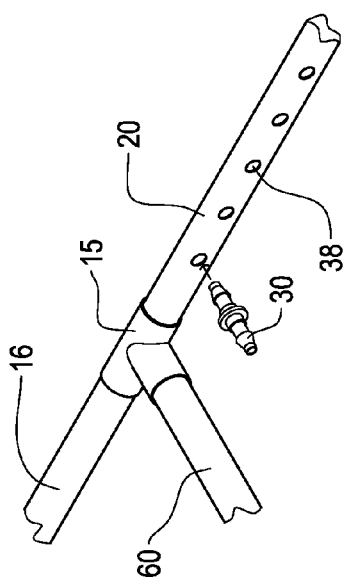

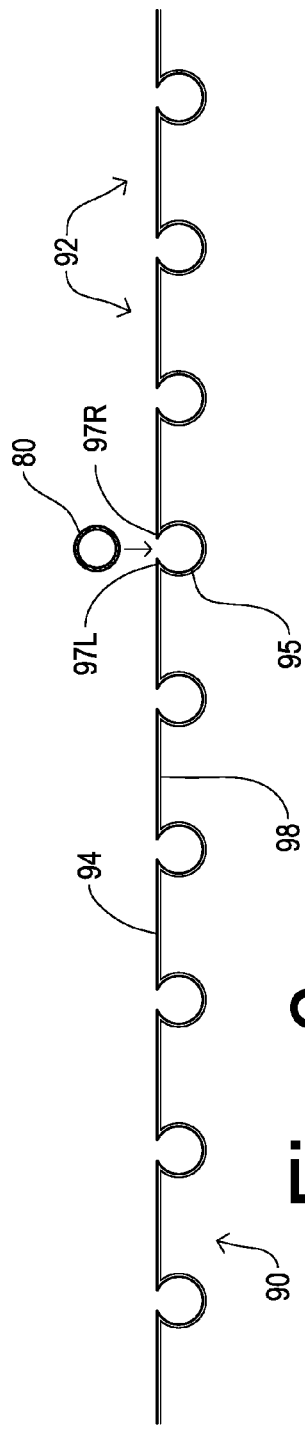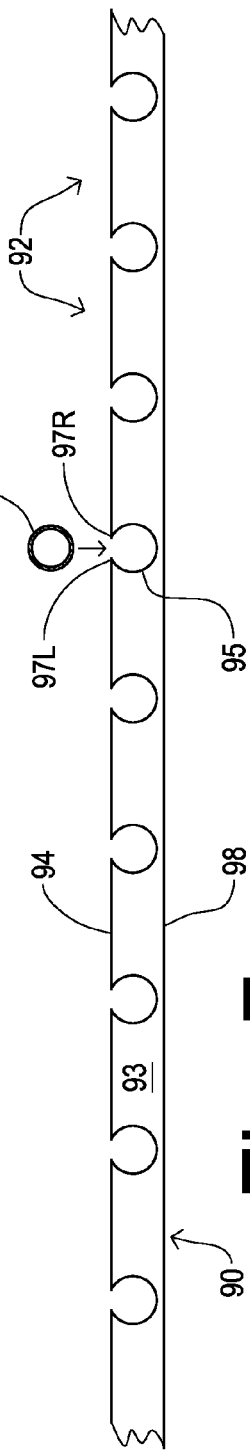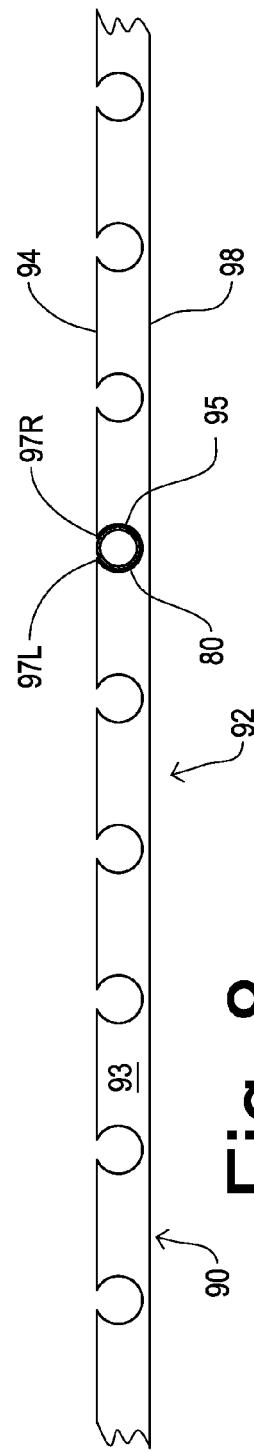

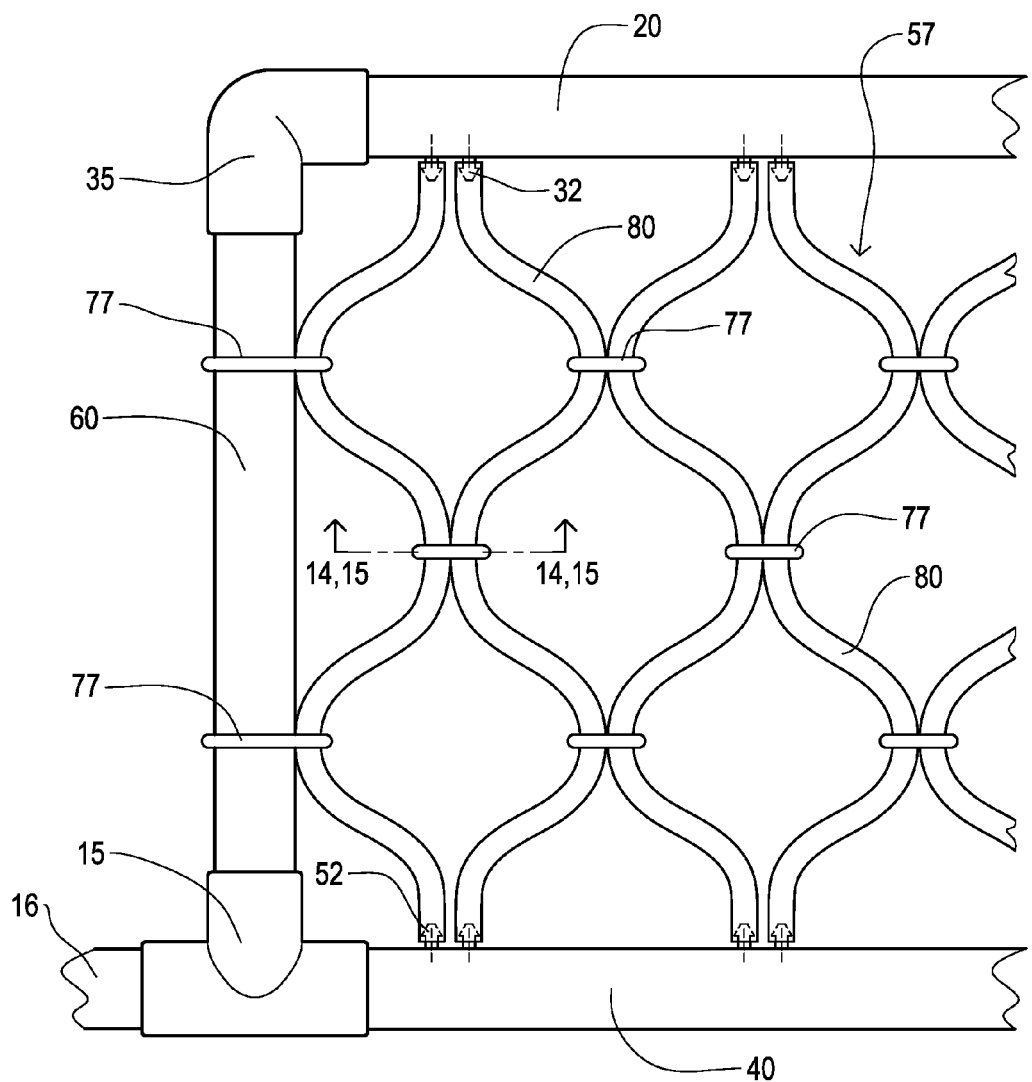
Fig. 13
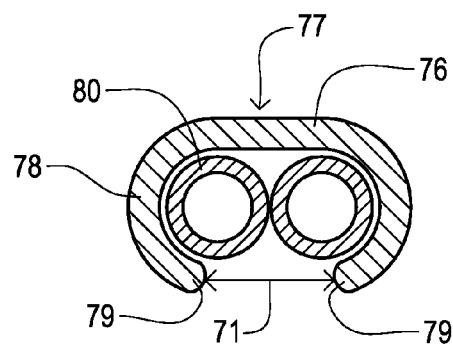
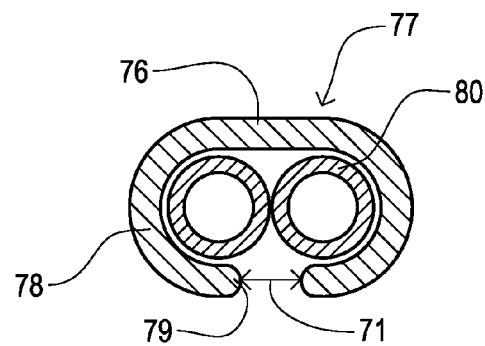
Fig. 14　　　　　Fig. 15

SUB-SURFACE IRRIGATION SYSTEM AND METHOD

CROSS-REFERENCE TO RELATED APPLICATIONS

This continuation-in-part nonprovisional application claims the benefit of co-pending U.S. patent application Ser. No. 14/826,952 that was filed on Aug. 14, 2015 and that issued on May 17, 2016 as U.S. Pat. No. 9,338,950, which is a divisional application claiming priority to U.S. patent application Ser. No. 14/681,084 that was filed on Apr. 8, 2015 and that issued on Sep. 22, 2015 as U.S. Pat. No. 9,137,956, both of which are incorporated herein in their entirety. A related application is PCT/US16/26808 filed on Apr. 8, 2016, which is incorporated herein in its entirety.

FIELD OF INVENTION

This invention relates generally to irrigation systems and, more particularly, to a sub-surface irrigation system having a set of multiple longitudinal perforated tubing members connected by a set of spacer or tubing cross members.

BACKGROUND OF THE INVENTION

Irrigation systems that supply water to grass landscape areas by means of irrigation pipes and sprinklers (such as pop-up or impact sprinklers) are well known. However, above-ground application of water presents problems, even when the above-ground system is functioning properly. It is recognized that a significant portion of the water supplied by sprinklers is not delivered to the root zone, but is lost to evaporation, overspray or run off.

Above-ground water application also has other problems. Buildings, cars, and outdoor furniture may be damaged or spotted by overspray. A lawn is not usable when the sprinklers are running. Freezing temperatures may damage the sprinkler heads or irrigation pipes.

Additionally, above-ground irrigation systems are easily damaged. Sprinkler heads and/or pipes may be broken by children, workers, vehicles, freezing temperatures, lawn mowers, blade/string trimmers, lawn edgers, or the like. Breakage or damage can result in significant water loss until the sprinkler head and/or pipe is repaired.

To address these problems of above-ground systems, underground or sub-surface systems have been developed. However, the available sub-surface systems are not easily adaptable to irregular or non-uniform landscape formats. Conventional sub-surface irrigation systems may be adequate for rectangular lawns, but very few lawns are exactly rectangular. Instead, most lawns are irregular in shape or have at least one irregular portion. Examples of irregularly shaped areas include a small grassy area between a pool and a wall, a narrow strip of grass between a sidewalk and a street, contoured areas of a golf course, and narrow strips of grass separating rows of car parking spaces in large parking lots. Currently available irrigation systems lack the adaptability to adequately address these varied shapes in a cost-effective and water-efficient manner.

Accordingly, there is a need for a sub-surface irrigation system and method that is adjustable and adaptable to the irregular landscape shapes and contours of any landscape format, that delivers water efficiently, and that minimizes water wastage.

BRIEF SUMMARY OF THE INVENTION

The present invention is directed to a sub-surface irrigation system and method that can provide water to both large and small landscape areas, while being adjustable and adaptable to the irregular landscape shapes and contours of any grassy or fully planted landscape area. The shape and contour of the area to be watered is referred to generally herein as the "landscape format."

The sub-surface irrigation system includes a set of longitudinal perforated tubing members and multiple lateral cross members. Each member of the set of longitudinal perforated tubing members has a tubing proximal end attached (or attachable to) a proximal lateral fluid conduit and has a tubing distal end attached (or attachable to) a distal lateral fluid conduit. Methods of adapting the set of longitudinal perforated tubing members to a particular landscape format are presented, including shortening portions of one or more longitudinal perforated tubing members and fluid conduits, terminating cut tubing members and fluid conduits, and connecting multiple sets of longitudinal perforated tubing members.

Two types of cross members that connect the longitudinal perforated tubing members are provided. The first type of cross member is a lateral spacer that holds each of the perforated tubing members in position; the spacers do not conduct fluid. The second type of cross member is a set of lateral perforated tubing members, each of which has both a first end and a second end attached to, optionally, one or two longitudinal fluid conduits; the lateral perforated tubing members are woven with the longitudinal perforated tubing members to form a grid-like pattern of fluid conducting tubing that exudes water. A particular length of the longitudinal perforated tubing members forming a grid-like pattern with a particular width of the spacer-type cross members (spacer/tubing array) or with the lateral tubing cross members (tubing/tubing array) is herein referred to as a "tubing grid."

A pre-determined length of the tubing grid may be purchased, but often the shape of the area to be watered (the "landscape format"), does not correspond precisely to the shape of the tubing grid. The longitudinal perforated tubing members, any spacers, any lateral perforated tubing members, and/or the lateral fluid conduits may be cut to accommodate the shape of a particular landscape format. Additional lateral and longitudinal fluid conduits may be added with additional sections of tubing grid. Methods of modifying (cutting, joining or ending) the tubing grid and lateral and longitudinal fluid conduits are provided, along with methods of utilizing the other various elements of the irrigation system. This allows the irrigation system presented herein to be adapted to any landscape format. One or more tubing grids, or sections thereof, along with the other connected elements that are needed to configure the one or more tubing grids to conform or fit to a particular landscape format is referred to as a "conformed irrigation unit."

After creation of the conformed irrigation unit, a water supply is attached to one of the fluid conduits and the conformed irrigation unit is buried underground.

An object of the present invention is to provide an easily modifiable irrigation system that can be customized to fit any landscape format, from multi-acre sized lawns to eight-inch strips of grass.

An additional object of the present invention is to provide a sub-surface irrigation system that reduces water waste through overspray, runoff and evaporation.

A further object of the present invention is to provide a sub-surface irrigation system that is robust and requires very little maintenance.

An additional object of the present invention is to provide a sub-surface irrigation system that can be buried at a depth that eliminates freezing.

A further object of the present invention is to provide a sub-surface irrigation system that allows usage of an irrigated grassy area concurrently with the application of water through the sub-surface irrigation system.

Another object of the present invention is to provide a sub-surface irrigation system that can be used in grassy or landscaped areas of the following: (1.) residential areas, including lawns of single family homes, common areas of townhomes and condo associations, and sidewalk landscaping; (2.) commercial areas, including office buildings, shopping centers, government establishments and campgrounds; and (3.) recreational areas, including parks, golf courses and playgrounds.

These and other objects, features, and advantages of the present invention will become more readily apparent from the attached drawings and from the detailed description of the preferred embodiments which follow.

BRIEF DESCRIPTION OF THE SEVERAL VIEWS OF THE DRAWINGS

The preferred embodiments of the invention will hereinafter be described in conjunction with the appended drawings, provided to illustrate and not to limit the invention, where like designations denote like elements.

FIG. 1 is a perspective view of a conformed irrigation unit of the first embodiment of the irrigation system 10 of the present invention, which is shown conformed or adapted to fit a particular landscape format in an environment of use.

FIG. 2 is a perspective diagram of the first embodiment of the irrigation system 10 of the present invention in roll 13 form (not to scale or at full width).

FIG. 3 is a detail view of the area at which a proximal lateral fluid conduit 20 connects to a longitudinal fluid conduit 60 of any of the embodiments of the invention, showing conduit apertures 38 within the lateral fluid conduit 20 into which an insertable connector 30 can be inserted.

FIG. 4 is a detail view of the area at which a proximal lateral fluid conduit 20 connects to a longitudinal fluid conduit 60 of any of the embodiments of the invention, showing insertable connectors 30 inserted into the lateral fluid conduit 20.

FIG. 5 is a detail view of the area at which a proximal lateral fluid conduit 20 connects to a longitudinal fluid conduit 60 of any of the embodiments of the invention, showing integral connectors 30 that are formed unitarily with the lateral fluid conduit 20.

FIG. 6 is a detail view of a portion of a first aspect of spacer 90 with one longitudinal perforated tubing member 80 ready for insertion into one of the partial-circular channels 95 of the spacer 90.

FIG. 7 is a detail view of a portion of a second aspect of the lateral spacer 90 with one longitudinal perforated tubing member 80 ready for insertion into one of the partial-circular channels 95 of the spacer 90.

FIG. 8 is a detail view of a portion of the second aspect of the lateral spacer 90 with one longitudinal perforated tubing member 80 inserted into a partial-circular channel 95.

FIG. 13 is a diagram of a third embodiment of the sub-surface irrigation system of the present invention showing an alternating curved tubing/tubing array 57 with clip-type spacers 77.

FIG. 14 is a cut view taken along line 14, 15 of a first aspect of a clip-type spacer 77 holding or securing two longitudinal perforated tubing members 80 together.

FIG. 15 is a cut view taken along line 14, 15 of a second aspect of a clip-type spacer 77 holding or securing two longitudinal perforated tubing members 80 together.

Like reference numerals refer to like parts throughout the several views of the drawings.

DETAILED DESCRIPTION OF THE INVENTION

Figure 9:
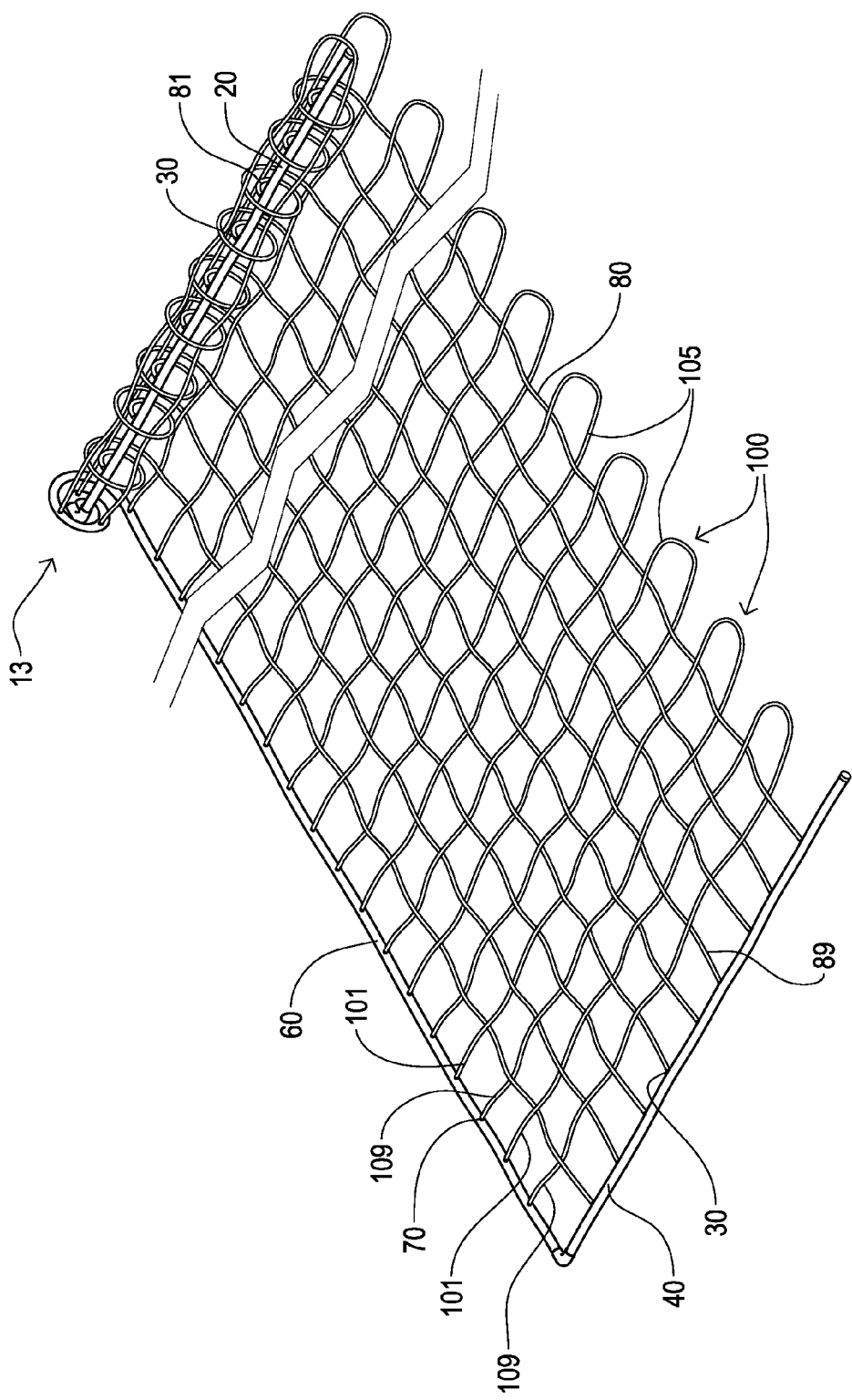
FIG. 9 is a perspective diagram of the second embodiment of the irrigation system of the present invention in roll 13 form (not to scale or at full width).

Shown throughout the figures, the present invention is directed toward a sub-surface irrigation system and to methods of installation and use of the sub-surface irrigation system. The sub-surface irrigation system, shown generally as reference number 10, is easy to install and to adapt to any landscape format while providing the advantages of an underground system.

Multiple embodiments of the sub-surface irrigation system 10 are presented. All embodiments have a set of spacer or tubing cross members, and all include multiple longitudinal perforated tubing members 80 that have a proximal end 81 fluidly connected to a proximal lateral fluid conduit 20. The proximal lateral fluid conduit 20 is fluidly connected to a longitudinal fluid conduit 60 (or, in some embodiments, two longitudinal fluid conduit 60) that is, in turn, fluidly connected to a distal lateral fluid conduit 40. The distal ends 89 of the multiple longitudinal perforated tubing members 80 are fluidly connected to the distal lateral fluid conduit 40. One of the fluid conduits (lateral fluid conduits 20, 40 or longitudinal fluid conduit(s) 60) is connected to a water source, which feeds water into the other conduits 20, 40, 60. Water is supplied to each of the multiple longitudinal perforated tubing members 80 through both the proximal end 81 (attached to proximal lateral fluid conduit 20) and distal end 89 (attached to distal lateral fluid conduit 40), and, in the embodiments with lateral perforated tubing members 100, to both ends of the lateral tubing members 100. This redundancy increases the efficiency and long-term usage of the system. For example, in the event that a point on one of the buried tubing members 80 becomes clogged or blocked, because the water is supplied from both the proximal end 81 and the distal end 89 up to the point of blockage, the water delivered to the landscape will not be reduced.

The first embodiment of the present invention is shown in FIGS. 1-8. In the first embodiment, the multiple longitudinal perforated tubing members 80 are held generally parallel by means of multiple cross-members, lateral spacers 90. The spacers 90 are aligned generally perpendicularly to the tubing members 80 in a tubing/spacer array that forms a grid-like organizational pattern or tubing grid. Both the multiple longitudinal perforated tubing members 80 and the spacers 90 may be manually cut as needed in conforming the irrigation system 10 to the landscape format of the area to be watered. The spacers 90 are configured to allow manual insertion and removal of portions of the tubing members 80, as may be needed when the elements of the irrigation system 10 are conformed to the shape of the landscape format. Therefore, preferably the spacers 90 do not lock the tubing members 80 in place, but lightly restrain each of the tubing members 80. However, spacers 90 that securely hold the tubing members 80 in place are within the scope of the invention.

FIG. 1 illustrates an exemplary application of the irrigation system 10 in which the irrigation system 10 is used in a narrow grassy area, such as between a sidewalk and street, creating a short, narrow landscape format. This landscape format is defined by lawn edging 19, which is shown surrounding grass 18. Various elements of the irrigation system 10 of the present invention are adapted to fit this particular narrow landscape format, thus forming a first exemplary conformed irrigation unit 11.

In the conformed irrigation unit 11 shown in FIG. 1, the first end 21 of proximal lateral fluid conduit 20 is connected to a water supply source through waterline 16 via a waterline-to-system connector 15. The waterline-to-system connector 15 that is shown in FIG. 1 is a three-way connector, so it serves to connect the proximal lateral fluid conduit 20 to both the waterline 16 and the longitudinal fluid conduit 60. Therefore, in this example, the waterline-to-system connector 15 also serves as a first lateral-to-longitudinal connector 35 (FIG. 13); however, other conventional types of waterline-to-system connectors 15 and various conventional types of separate connectors are within the scope of the invention.

The longitudinal fluid conduit 60 is connected to the distal lateral fluid conduit 40 via a second lateral-to-longitudinal connector 75. The distal lateral fluid conduit 40 terminates via a distal lateral terminal fitting 45, which in the conformed irrigation unit 11 of FIG. 1 is an end cap, but may alternatively be a fluid-conducting fitting when the irrigation systems 10 is adapted to other landscape formats. Similarly, the second end 29 of proximal lateral fluid conduit 20 is shown in FIG. 1 as terminating in a proximal lateral terminal fitting 25, but may alternatively be a fluid-conducting fitting when the irrigation systems 10 is adapted to other landscape formats.

Figure 10:
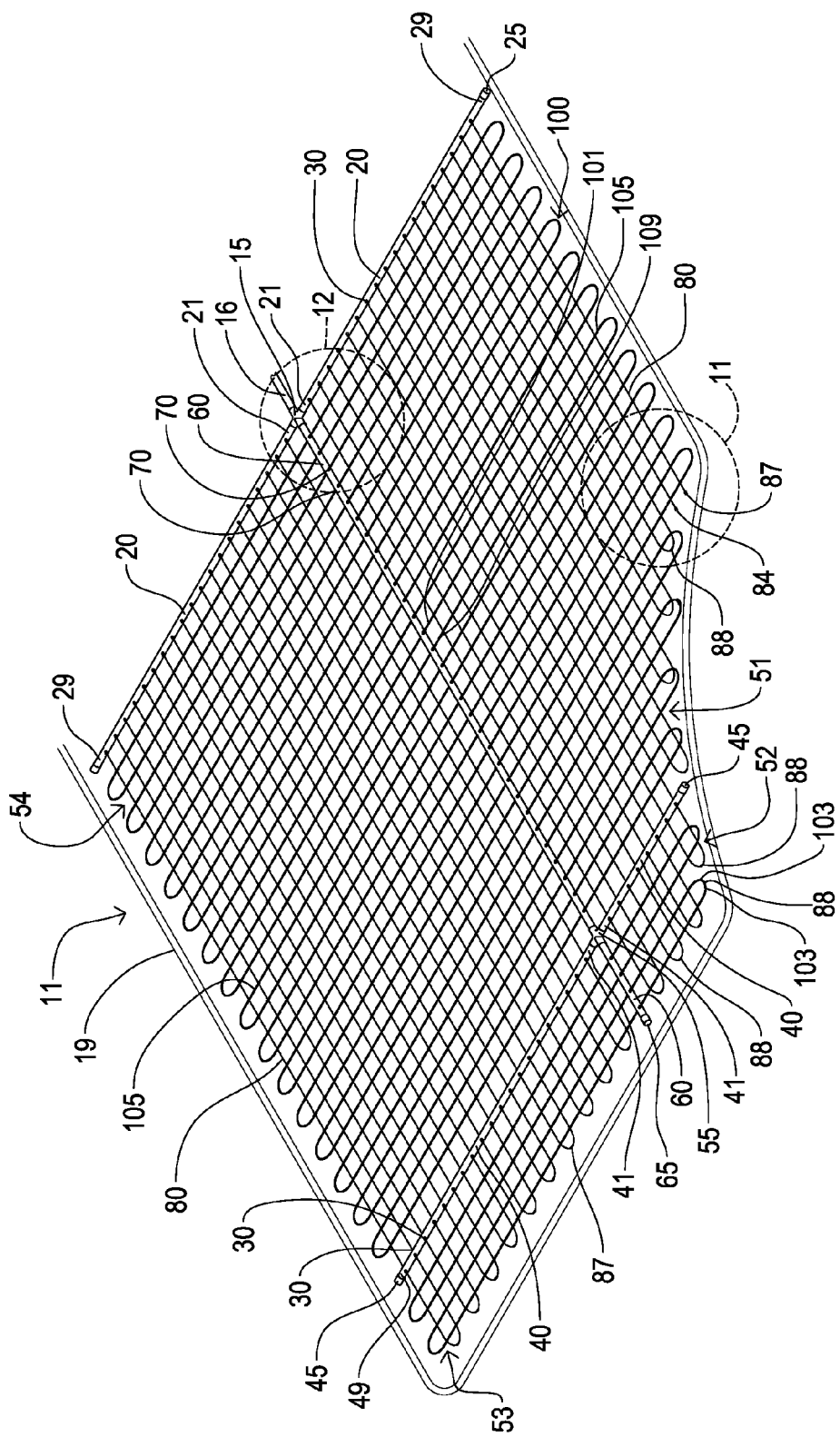
FIG. 10 is a perspective view of a conformed irrigation unit 11 incorporating four tubing grids of the second embodiment of the irrigation system of the present invention, which are conformed or adapted to fit a specific landscape format.

Various other types of connectors may also be used for the proximal lateral terminal fitting 25 and the distal lateral terminal fitting 45, as needed to accommodate other landscape formats. For example, if the landscape format is wider than the width of the available provided section of the irrigation system, two sections may need to be joined (as shown in FIG. 10 in relation to the second embodiment), so a second distal lateral fluid conduit 40 may be fluidly connected to the first distal lateral fluid conduit 40 and a second proximal lateral fluid conduit 20 may be fluidly connected to the first proximal lateral fluid conduit 20, thereby increasing the width of the conformed irrigation unit 11. In this case, the lateral terminal fittings 25, 45 would both be fluid-conducting fittings. In a second example, if the landscape format is longer than the length of the available irrigation system section, two sections may need to be joined longitudinally by adding a second longitudinal fluid conduit 60 (FIG. 10).

As seen in FIG. 1, the proximal ends 81 of the multiple longitudinal perforated tubing members 80 are fluidly connected to the proximal lateral fluid conduit 20, and the distal ends 89 of the multiple longitudinal perforated tubing members 80 are fluidly connected to the distal lateral fluid conduit 40. The tubing proximal ends 81 and distal ends 89 may be connected to the proximal lateral fluid conduit 20 and distal lateral fluid conduit 40, respectively, via a tubing connector 30, which may be an insertable connector or an integral connector. The tubing connector 30 may be insertable into conduit aperture 38, as shown in the detail of FIGS. 3-4. Alternatively, as seen in FIG. 5, the tubing connector 30 may be an integral connector which is formed integrally with the proximal lateral fluid conduit 20 and/or the distal lateral fluid conduit 40.

Each of the multiple spacers 90 has a spacer first end 91 and a spacer second end 99. Each of the spacers 90 has multiple straight portions 92 (FIGS. 6-8) interspersed with multiple partial-circular channels 95 (FIGS. 6-8). Each of the partial-circular channels 95 is sized and configured to allow the insertion of a portion of one of the multiple longitudinal perforated tubing members 80.

As seen in FIG. 1, when the irrigation system 10 is in the environment of use, the spacers 90 preferably extend somewhat beyond the first one of the multiple longitudinal perforated tubing members 80 (spacer first end 91 ending short of the longitudinal fluid conduit 60) to beyond the last one of the multiple longitudinal perforated tubing members 80 (spacer second end 99 ending short of the left lower lawn-edging 19). Though the spacers 90 are illustrated as ending just short of the longitudinal fluid conduit 60, they may optionally be attached to conduit 60 for stability. Typically, some or all of the spacers 90 and the multiple longitudinal perforated tubing members 80 will need to be cut to achieve the required length and/or width needed to cause the tubing grid to fit the landscape format. The longitudinal distance between each of the spacers 90 may vary, but preferably the distance between adjacent spacers 90 may be in the range of 6 inches to 10 feet. Because the spacers 90 are used to provide lateral support to the grid-like tubing/spacer array and not to provide water, the separation between spacers does not impact the water distribution uniformity. In contrast, the tubing members 80 are preferably fairly close together to provide uniform watering. Though the distance of separation between adjacent tubing members 80 may vary, the lateral distance between each of the generally parallel multiple longitudinal perforated tubing members 80, in this and the other embodiments, is preferably in the range of 2 to 24 inches and is most preferably in the range of 4 to 12 inches.

The multiple straight portions 92 are interspersed with multiple partial-circular channels 95 that accommodate a portion of one of the tubing members 80. Each partial-circular channel 95 defines a channel having the shape of a partial circle with a top opening endpoints 97L, 97R defined by a chord connecting the endpoints of an arc of between 50 and 140 degrees. The inner diameter of the partial-circular channel 95 is equal to, or slightly larger than, the outside diameter of the longitudinal perforated tubing members 80. The distance between the top opening endpoints 97L, 97R is sufficient to allow the insertion of a segment of tubing member 80; the segment of tubing member 80 is shown before insertion in FIGS. 6 and 7 and is shown fully inserted in FIG. 8. The distance between the center of the circle of a first partial-circular channel 95 to the center of the circle of an adjacent partial-circular channel 95 is equal to the lateral distance between each of the generally parallel multiple longitudinal perforated tubing members 80, so is preferably in the range of 2 inches to 24 inches.

Spacers 90 may be formed in a variety of ways, with the limitation that partial-circular channels 95 can be formed alternating with straight portions 92. Two exemplary aspects are shown in FIGS. 6-8.

In FIG. 6, in a first aspect, the spacers 90 may be formed of a thin circular rod material that is bent/formed to create a partial-circular channel 95 between each of the straight portions 92. The bending/forming creates top opening endpoints 97L, 97R between the ends of the straight portions 92 and the partial-circular channels 95. The rod material may be a wire or thin rod. Suitable thin rod materials are, for example, stainless steel or aluminum wire, square or round aluminum or stainless steel rods or tubes, square or round plastic rods, and the like.

In a second aspect, shown in FIGS. 7-8, rectangular-type spacers 90 may be formed of a rectangular rod with the partial-circular channels 95 formed as depressions within the rod creating an opening in the spacer top surface 94 defined by top opening endpoints 97L, 97R. The partial-circular channels 95 may be formed within the rod (for example, formed integrally with a plastic rod) or cut out from the rod material (for example, with a metal rod). Each of the spacers 90 has a spacer top surface 94, a spacer bottom surface 98, a spacer front surface 93, and an opposing spacer rear surface. Each of the partial-circular channels 95 is a through channel extending through the rectangular rod from said spacer front surface 93 to said spacer rear. The rectangular-type spacer 90 may be formed of plastic, stainless steel, aluminum, steel, or other metal.

FIG. 2 is a simplified diagram of a roll 13 of the first embodiment of irrigation system 10. It is anticipated that all embodiments of the irrigation system 10 will be sold in rolls of a pre-determined width and length based on considerations such as manufacturing capabilities and efficiencies, transportation costs, warehouse and retail store shelf space considerations, storage space, and convenience for retail sales. Though roll 13 (of any of the embodiments) may be supplied in any of a variety of lengths and widths, it is anticipated that the width will be in the range of 6 to 20 feet and that the length will be in the range of 25 to 200 feet, with the preferred width in the range of 8 to 12 feet and the preferred length in the range of 50 to 125 feet.

For example, the manufacturer may wind a section of the pre-determined width of any of the embodiments of the irrigation system 10 on an axis to form a generally cylindrical roll 13. For example, the proximal lateral fluid conduit 20 may be used as internal axis with the longitudinal fluid conduit 60 with the attached interwoven multiple lateral perforated tubing members 100 and said multiple longitudinal perforated tubing members 80 wound to form the generally cylindrical roll (13). Preferably the free end of the roll 13 would be formed by the distal lateral fluid conduit 40, but, optionally, the free end may be contained for shipping by a restraining device, such as plastic wrap, tape, or the like. (Note that in later embodiments which have two longitudinal fluid conduits 60, both conduits 60 would be wound in this manner.) After forming the roll 13, it may be wrapped with plastic film for easy handling and may be shipped to a retail store or a construction company warehouse. The roll 13 may then be paid out to provide the required length for a particular purchaser or a specific application.

The roll 13 includes a pre-determined number of longitudinal perforated tubing members 80 with a pre-determined number of lateral spacers 90. The roll 13 may optionally include a pre-connected proximal lateral fluid conduit 20, distal lateral fluid conduit 40, and/or longitudinal fluid conduit 60. (In other embodiments, the roll may also include a second longitudinal fluid conduit 60 and lateral tubing members 100.) If the proximal lateral fluid conduit 20 and distal lateral fluid conduit 40 are not included in the manufactured roll 13, a restraining device may be used to hold the proximal and distal ends of the longitudinal perforated tubing members 80 in position at the ends of roll 13 if needed for ease of shipping and/or to hold and/or support the ends of spacers 90. Preferably, proximal lateral fluid conduit 20 is included with roll 13, but the distal lateral fluid conduit 40 and longitudinal fluid conduit 60 may be sold separately. For larger landscape formats, it is anticipated that proximal lateral fluid conduit 20, distal lateral fluid conduit 40, and/or longitudinal fluid conduit 60 may be sold with conduit apertures 38 (FIGS. 3-4) or integral tubing connectors (FIG. 5) disposed on opposite sides of the conduits 20, 40, 60. The provision of dual-aperture and/or dual-connector conduits 20, 40, 60 will facilitate the installation of adjacent tubing/spacer arrays of the first embodiment or tubing/tubing arrays of the second embodiment, as will be required when the size of the landscape format exceeds the size of the provided roll 13.

Figure 11:
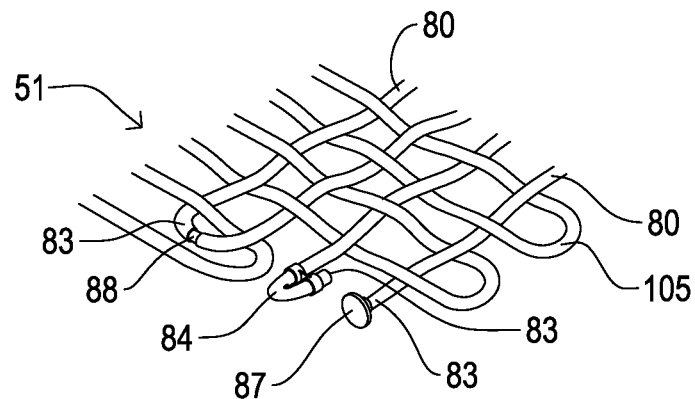
FIG. 11 is a detail view taken from circle 11 of FIG. 10 showing joining and ending mechanisms and methods.

FIGS. 9-11 illustrate a second embodiment of the subsurface irrigation system 10 of the present invention. The second embodiment is similar to the first embodiment in that both create a grid-like pattern with redundant water supply provided to both the proximal end 81 and the distal end 89 of the longitudinal perforated tubing members 80. In both embodiments, the tubing ends 81, 89 are fluidly connected to proximal and distal lateral fluid conduits 20, 40. In both embodiments, the longitudinal fluid conduit 60 is fluidly connected to the proximal and distal lateral fluid conduits 20, 40. The variation in the second embodiment, in contrast to the first embodiment, is in the lateral members of the grid-like pattern. In the first embodiment, the lateral members are spacers 90 (which create a tubing/spacer array), but in the second embodiment, the lateral members are lateral perforated tubing members 100 that are interwoven with the longitudinal perforated tubing members 80 (which create a tubing/tubing array).

Each of the multiple lateral perforated tubing members 100 have both a first end 101 and a second end 109, which, in the second embodiment, are connected to the single longitudinal fluid conduit 60. Each lateral perforated tubing member 100 extends from the longitudinal fluid conduit 60 outward from tubing-to-longitudinal connector 70, weaving alternately over and under each of the longitudinal perforated tubing members 80 beginning with the longitudinal perforated tubing member 80 nearest the longitudinal fluid conduit 60. When the lateral perforated tubing member 100 is past the furthest longitudinal perforated tubing members 80, the lateral perforated tubing member 100 is turned at tubing middle section 105; it is then woven alternately over and under each of the longitudinal perforated tubing members 80, beginning with the longitudinal perforated tubing member 80 furthest from the longitudinal fluid conduit 60, and continuing back to the longitudinal perforated tubing member 80 nearest the longitudinal fluid conduit 60. Then, the second end 109 of the lateral perforated tubing member 100 is connected to the same longitudinal fluid conduit 60 at a second tubing-to-longitudinal connector 70.

FIG. 9 is a simplified diagram of a roll 13 of the irrigation system 10 (not shown to scale, not shown at the full preferred width and length), which may be sized and fabricated as discussed above.

The roll 13 of the irrigation system 10 includes both the multiple longitudinal perforated tubing members 80 and the multiple lateral perforated tubing members 100. Optionally, the roll 13 may also include proximal lateral fluid conduit 20, distal lateral fluid conduit 40, and/or longitudinal fluid conduit 60. One or more restraining devices may optionally be used to hold the proximal ends 81 and/or distal ends 89 and/or the first ends 101 and second ends 109 of the lateral perforated tubing members 100 in position at the ends and one or both sides of roll 13 for shipping.

FIG. 10 shows a combination of elements of the irrigation system 10 in which multiple tubing/tubing arrays 51, 52, 53, 54 have been purchased, modified, and joined with additional elements of the irrigation system 10 to create a conformed irrigation unit 11 that is sized and configured to provide water to a specific landscape format, which is defined by lawn edging 19. Though shown in relation to the second embodiment, most aspect of the creation of the conformed irrigation unit 11 apply to the other embodiments. When conforming the multiple tubing/tubing arrays 51, 52, 53, 54 to fit the particular landscape format, some of the ends of the tubing 80, 100 and conduits 20, 40, 60 will necessarily be cut. In any application of the irrigation system 10, the user must attend to any cut ends to prevent water from flowing out of the open ends. Examples of means and methods to address the cut ends 83 are shown in the detail view of FIG. 11. When possible, it is preferred that the cut ends 83 be joined via a tubing joiner 88 (or, if dealing with three or four cut ends, with one of the angled connectors of FIGS. 18-25); this optimizes the redundancy of the irrigation system 10. The tubing joiner 88 may be any conventional tubing connector; it is shown as a double male connector. Depending on the configuration needed to fit the landscape format, at times the cut ends will need to be closed off. Examples of closure mechanisms include a tube closure or line plug 87 (sometimes called a "goof plug"), a kinked line hose end closure 84 (sometimes called a "figure eight"), and other similar conventional termination fittings.

Figure 12:
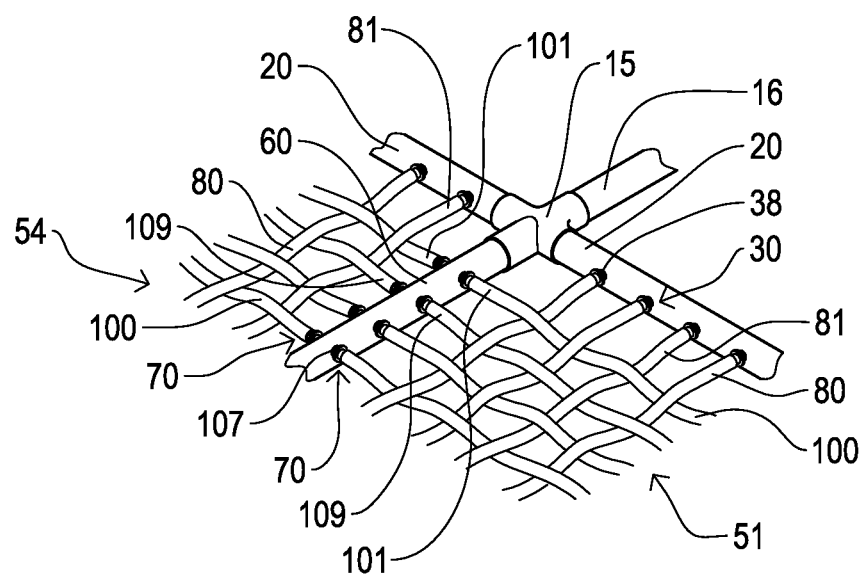
FIG. 12 is a detail view taken from circle 12 of FIG. 10 showing attachment points of the tubing proximal ends 81 of the longitudinal perforated tubing members 80 and showing the attachment points of the lateral tubing first ends 101 and lateral tubing second ends 109 of lateral perforated tubing members 100.

The detail view of FIG. 12 shows portions of two tubing/tubing arrays 51 and 54. The proximal lateral fluid conduit 20 of tubing/tubing array 51 is connected via a four-way waterline-to-system connector 15 to the proximal lateral fluid conduit 20 of tubing/tubing array 54. A single longitudinal fluid conduit 60 and a waterline 16 from a water resource (such as from a valve in an irrigation system) are also attached to the four-way waterline-to-system connector 15.

In the tubing/tubing array 51 of FIG. 12, the proximal lateral fluid conduit 20 is connected via tubing-to-lateral connector 30 to the proximal ends 81 of the longitudinal perforated tubing members 80. Also seen in the tubing/tubing array 51, the lateral tubing first ends 101 and second ends 109 are connected via tubing-to-longitudinal connectors 70 to the longitudinal fluid conduit 60.

In FIG. 12, compared to the positioning of tubing/tubing array 51, tubing/tubing array 54 is shown in a flipped or inverted position, and both the lateral tubing first and second ends 101, 109 of tubing/tubing array 51 and the lateral tubing first and second ends 101, 109 of tubing/tubing array 54 are connected to the same longitudinal fluid conduit 60. Therefore, two sets of tubing 100 are connected to opposite sides of the longitudinal fluid conduit 60—the lateral tubing first ends 101 and second ends 109 of the tubing/tubing array 51 are shown connected to the right side and the lateral tubing first ends 101 and second ends 109 of the tubing/tubing array 54 are shown connected to the left side. To facilitate easy installation, a longitudinal fluid conduit 60 with dual opposing rows of apertures 38 is preferably provided for use. As in tubing/tubing array 51, in tubing/tubing array 54 the proximal lateral fluid conduit 20 is connected to the proximal ends 81 of the longitudinal perforated tubing members 80.

The alternating curved tubing/tubing array 57 of the third embodiment is illustrated in FIG. 13. The third embodiment is similar to the first embodiment in that the proximal ends 81 and the distal ends 89 of the longitudinal tubing 80 are attached to the proximal lateral fluid conduit 20 and the distal lateral fluid conduit 40, respectively. The third embodiment varies from the first embodiment in that the longitudinal perforated tubing members 80 are curved instead of substantially parallel and in that the spacers are clip-type spacers 77. Each longitudinal perforated tubing member 80 curves alternately leftward and rightward.

As seen in FIG. 13, a larger conduit-to-tubing clip-type spacer 77 is provided to secure the adjacent curves of the longitudinal tubing member 80 that is nearest the longitudinal fluid conduit 60 to the adjacent longitudinal fluid conduit 60. Smaller tubing-to-tubing clip-type spacers 77 secure alternating curves of the longitudinal tubing members 80. The right curves of a particular longitudinal tubing member 80 are secured to the left curves of the longitudinal tubing member 80 directly to the right, while the left curves of the particular longitudinal tubing member 80 are secured to the right curves of the longitudinal tubing member 80 directly to the left, unless the particular longitudinal tubing member 80 is the longitudinal member 80 adjacent to the one or more longitudinal fluid conduits 60. If the particular longitudinal tubing member 80 is the outermost longitudinal member 80 adjacent to the one or more longitudinal fluid conduits 60, multiple conduit-to-tubing clip-type spacers 77 secure the outermost curves of the outermost longitudinal tubing member 80 to the longitudinal fluid conduit 60.

The clip-type spacer 77, as seen in FIGS. 14-15, has an extending, generally straight, upper portion 76. The clip-type spacer 77 is generally rod-like and may have a circular, square, rectangular, hexagonal, or other geometric-shaped cross-section. The opposing right and left parts of the upper portion 76 are bent, rounded or otherwise formed into curved portions 78 that each terminate at an ending portion 79. The curved portions 78 are generally C-shaped. Each of the opposing curved portions 78 serves to partially enclose or encircle one of the two water-carrying tubular members (member 80 and member 80 or member 80 and conduit 60) that are captured within the clip-type spacer 77. In the smaller tubing-to-tubing clip-type spacers 77, the inside diameter of the both right and left curved portions 78 is equal to or slightly larger than the outside diameter of the tubing member 80 to be used with the clip-type spacer 77.

The larger conduit-to-tubing clip-type spacer 77 is provided to secure the leftward curve of the longitudinal tubing member 80 that is nearest the longitudinal fluid conduit 60 to the longitudinal fluid conduit 60. Therefore, the inside diameters of the right and left curved portions 78 of a conduit-to-tubing clip-type spacer 77 are not equal, but a first curved portion 78 (which may be referred to as either right or left, because the clip-type spacer 77 is reversible) is equal to or slightly larger than the outside diameter of the tubing member 80, but the curved portion of the opposing second side is equal to or slightly larger than the outside diameter of the longitudinal fluid conduit 60.

The ending-to-ending opening 71 between the right and left ending portions 79 is sufficient to allow insertion of the two water-carrying tubular members, either two tubing members 80 (in the case of the tubing-to-tubing clip-type spacer 77) or one longitudinal fluid conduit 60 and one tubing member 80 (in the case of the conduit-to-tubing clip-type spacer 77). FIG. 14 illustrates a wider ending-to-ending opening 71, while FIG. 15 illustrates a narrower ending-to-ending opening 71. The length of the ending-to-ending opening 71 is at least equal to the outside diameter of the larger of the water-carrying tubular members to be received within the spacer 77, which would be tubing member 80 (in the case of the tubing-to-tubing clip-type spacer 77) or the longitudinal fluid conduit 60 (in the case of the conduit-to-tubing clip-type spacer 77).

The clip-type spacers 77 may be formed of wire or thin rod material, which may be metal or plastic.

FIG. 13 also illustrates that it is not necessary to connect the waterline 16 at the intersection of proximal lateral fluid conduit 20 and longitudinal fluid conduit 60, as shown in the other figures, but the waterline (providing water from an irrigation control valve) may be attached to any of the conduits 20, 40, or 60. The waterline 16 may be connected in the location deemed by the installer to be the most convenient, which may be at the ends, intersections or middle of any of the conduits 20, 40, or 60. In general, the location of the valve to which the waterline 16 is connected and the distance the waterline 16 will need to be run to reach one of the conduit 20, 40, or 60 will likely affect the installer's choice. In FIG. 13, the waterline 16 is shown connected to the intersection of conduit 40 and 60.

Figure 16:
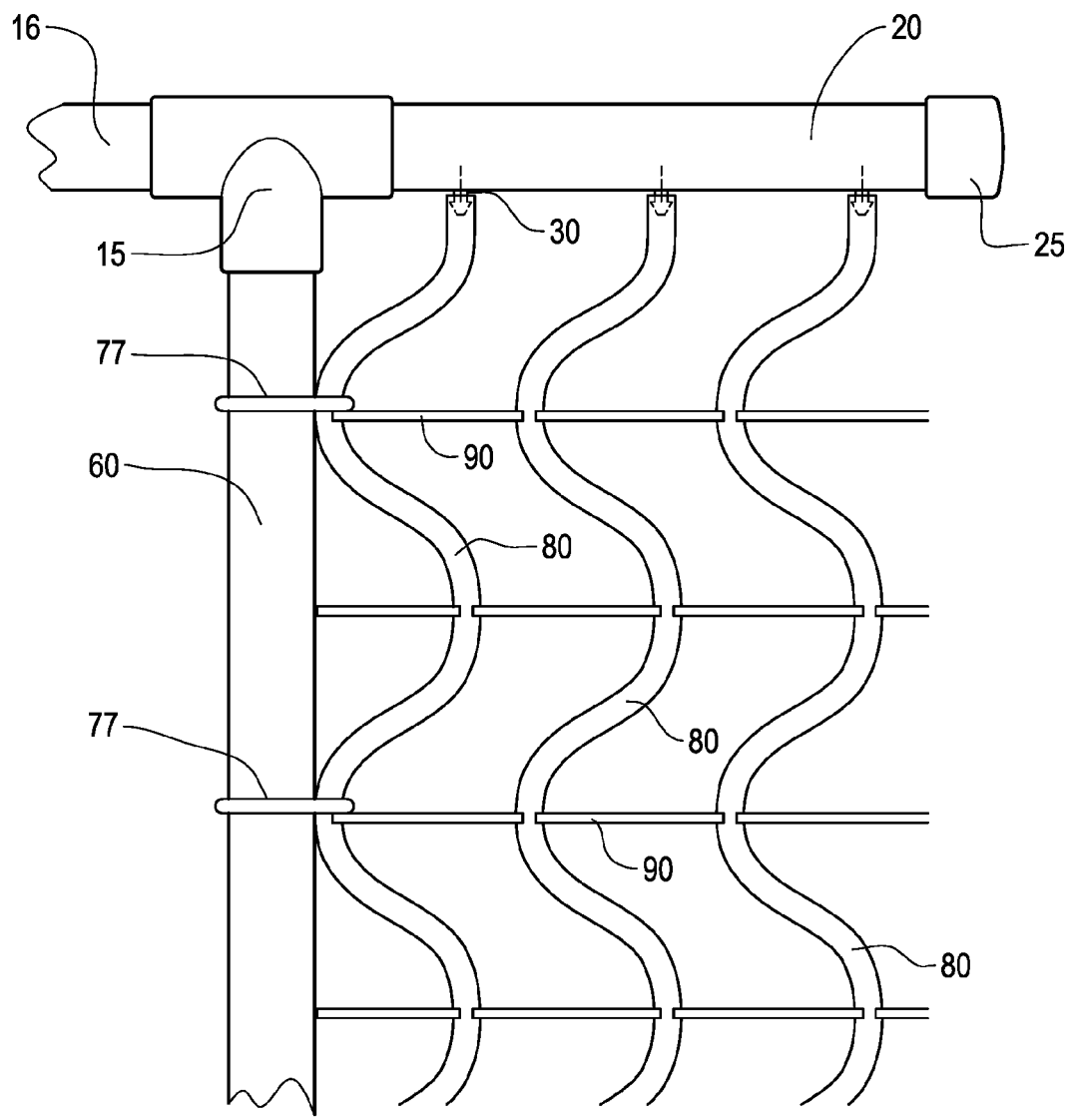
FIG. 16 is a diagram of a fourth embodiment of the present invention that utilizes a combination of both spacer types, lateral spacers 90 and clip-type spacers 77.

The fourth embodiment is illustrated in FIG. 16. The fourth embodiment is similar to the first and third embodiments in that the proximal ends 81 and the distal ends 89 of the longitudinal tubing members 80 are attached to the proximal lateral fluid conduit 20 and the distal lateral fluid conduit 40, respectively. The fourth embodiment varies from the first embodiment in that the sections of longitudinal tubing members 80 are curved instead of parallel and in that an additional conduit-to-tubing clasp (or the larger conduit-to-tubing clip-type spacer 77 of FIG. 13) is used to secure the innermost curves of the innermost longitudinal tubing members 80 to the longitudinal fluid conduit 60. Optionally, in this embodiment and other embodiments with spacers, all spacers 90 may be connected to longitudinal fluid conduit 60 to provide additional stability.

Figure 17:
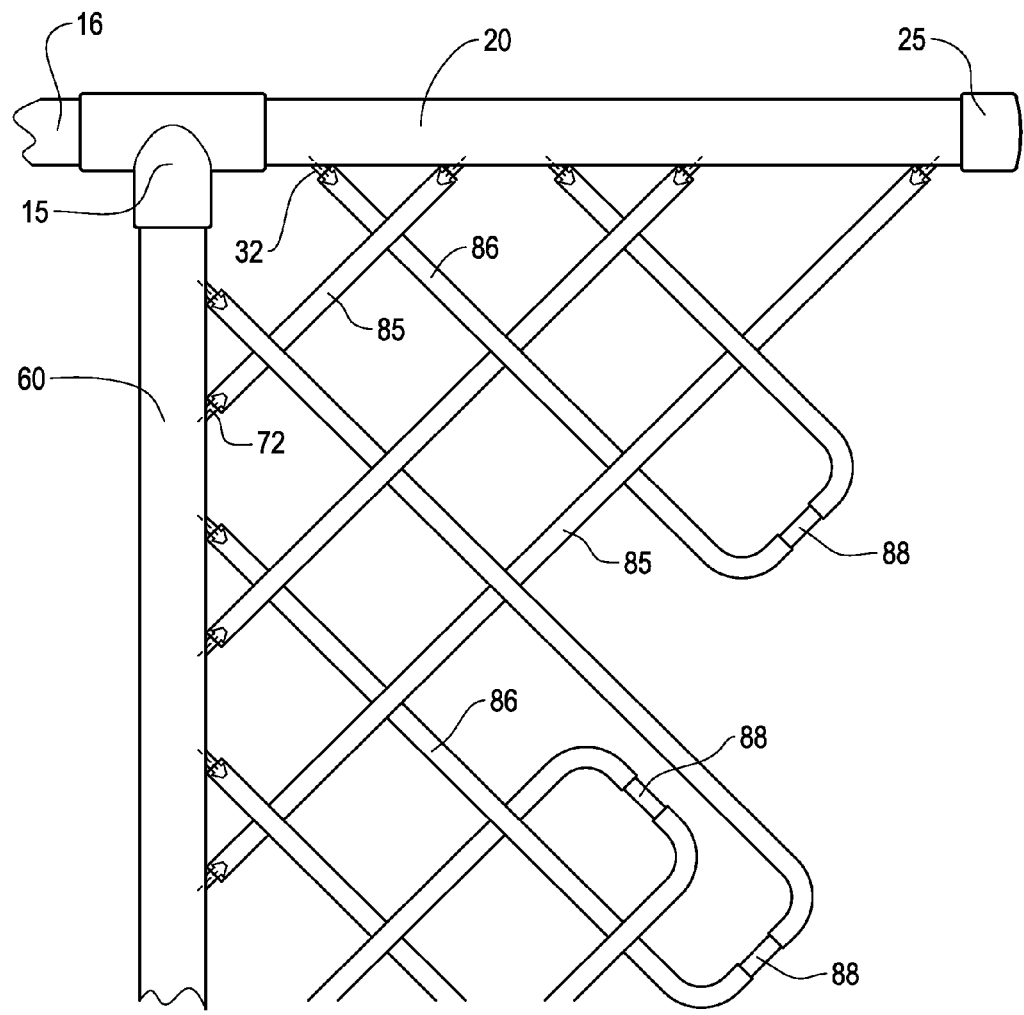
FIG. 17 is a diagram of a fifth embodiment of the present invention.
Figure 18:
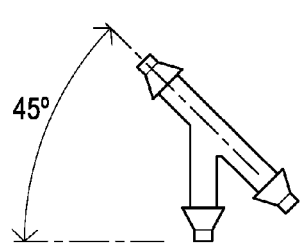
FIG. 18 is a top view of a 45-degree 3-way connector for use with the sub-surface irrigation system of the present invention.
Figure 19:
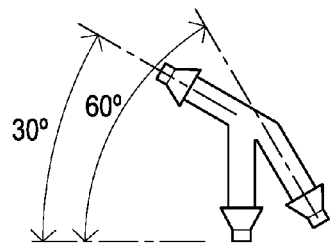
FIG. 19 is a top view of a 30-60-degree 3-way connector for use with the sub-surface irrigation system of the present invention.
Figure 20:
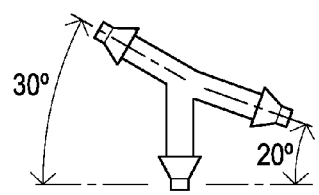
FIG. 20 is a top view of a 20-30-degree 3-way connector for use with the sub-surface irrigation system of the present invention.
Figure 21:
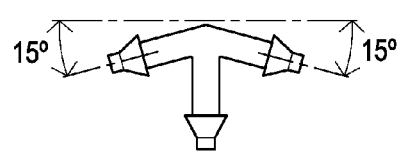
FIG. 21 is a top view of a 15-15-degree convex connector for use with the sub-surface irrigation system of the present invention.
Figure 22:
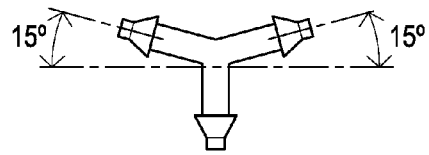
FIG. 22 is a top view of a 15-15-degree concave connector for use with the sub-surface irrigation system of the present invention.
Figure 23:
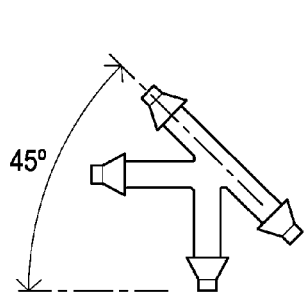
FIG. 23 is a top view of a 45-degree 4-way connector for use with the sub-surface irrigation system of the present invention.
Figure 24:
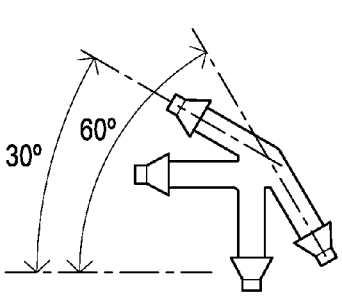
FIG. 24 is a top view of a 30-60-degree 4-way connector for use with the sub-surface irrigation system of the present invention.
Figure 25:
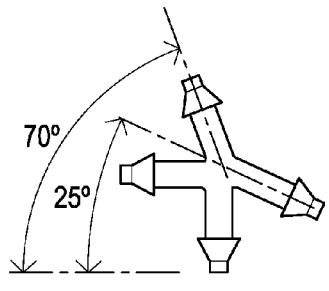
FIG. 25 is a top view of a 20-30-degree 4-way connector for use with the sub-surface irrigation system of the present invention.

The fifth embodiment, illustrated in FIG. 17, is similar to the second embodiment, but provides a variation in the longitudinal tubing members 80. In contrast to the longitudinal tubing members 80 of the second embodiment, the tubing members of this fifth embodiment are diagonal tubing members 85, 86. Each of the diagonal tubing members 85, 86 is connected to the proximal lateral fluid conduit 20 and/or the longitudinal fluid conduit 60 at a 45-degree angle. The diagonal tubing members 85 connect directly between the proximal lateral fluid conduit 20 and the longitudinal fluid conduit 60 or between the distal lateral fluid conduit 40 and the longitudinal fluid conduit 60. The diagonal tubing members 86 connect to the proximal lateral fluid conduit 20 or to the longitudinal fluid conduit 60, and then extend outwardly and return to attach to the same proximal lateral fluid conduit 20 or longitudinal fluid conduit 60 from which they extended. (Optionally, a single diagonal tubing member 86 can connect near the inner corner of the proximal lateral fluid conduit 20, extend outwardly, and then return to connect to the inner corner of the longitudinal fluid conduit 60.)

The angled connectors shown in FIGS. 18-25 exemplify connectors that may be utilized as termination connectors usable with any of the embodiments of the present invention or with conventional irrigation systems. Depending on the shape of the landscape format, it may be preferable to join two, three or four of the cut ends of the longitudinal tubing members 80 and/or the cut ends of the lateral tubing members 100 with one of the angled connectors presented in FIGS. 18-25. For example, if the distal ends 89 of three longitudinal tubing members 80 extend over the edge of the landscape format—thus needing to be cut—they may be joined by the 15-15-degree convex connector of FIG. 21, thereby preserving the redundant water provision to all three longitudinal tubing members 80. The angled connectors allow connection of three or four tubing members 80, 100 in a manner that accommodates any of a wide variety of situations.

The method of installing the irrigation system 10 will now be discussed in relation to both the first and second embodiments; similar methods would be utilized to install the other embodiments. In general, if the landscape format is wider than the width of one of the provided arrays (tubing/spacer array or tubing/tubing array), an additional array may be added laterally by extending the lateral fluid conduit 20, 40 with one or more additional lateral fluid conduits 20, 40. And, if the landscape format is longer than the length of one of the provided arrays, one or more additional arrays may be added longitudinally by adding one or more longitudinal fluid conduits 60 to the first longitudinal fluid conduit 60. Optionally, the provided proximal lateral fluid conduits 20, distal lateral fluid conduits 40, and/or longitudinal fluid conduits 60 may be pre-configured with dual conduit apertures 38 (FIGS. 3-4) or dual integral tubing connectors (FIG. 5) disposed on opposite sides of the conduits 20, 40 and/or 60. This will allow multiple tubing/spacer arrays or tubing/tubing arrays to be readily installed without the need for the installer to create apertures 38 on the side of the conduit 20, 40 and/or 60 opposing the first set of apertures 38 or integral tubing connectors.

The first embodiment of the irrigation system 10 of FIGS. 1-8 may be installed by obtaining a tubing/spacer array of a pre-determined width and length with a particular number of the longitudinal perforated tubing members 80 joined by a particular number of lateral spacers 90, which may be the width and length of the manufactured roll 13 or any subset thereof. It will be assumed that the tubing/spacer array has been provided without lateral conduits 20, 40 or longitudinal conduit 60, though these could be pre-attached in the provided tubing/spacer grid. The width of the tubing/spacer array may be determined by the width of the roll 13 that is available to the user.

The provided tubing/spacer array is placed on the ground in the area of the lawn to be watered. Any portions of the spacers 90 or of the longitudinal tubing members 80 that extend over the edges of the landscape format (shown as lawn-edging 19 in FIG. 1) are cut. A proximal lateral fluid conduit 20 is obtained, and the tubing proximal ends 81 of longitudinal tubing members 80 are connected to it via tubing-to-lateral connector 30.

A longitudinal fluid conduit 60 and a distal lateral fluid conduit 40 are obtained. The first end of the longitudinal fluid conduit 60 is fluidly connected to a first end of the proximal lateral fluid conduit 20 via a first lateral-to-longitudinal connector, shown in FIG. 1 as a part of waterline-to-system connector 15 and shown in FIG. 13 as connector 35. The second end of the longitudinal fluid conduit 60 is fluidly connected to a first end of the distal lateral fluid conduit 40 via the second lateral-to-longitudinal connector 75. The distal ends 89 of the longitudinal tubing members 80 are fluidly connected via tubing-to-lateral connectors 30 to distal lateral fluid conduit 40. The water source is connected to the first proximal lateral fluid conduit 20 via a waterline-to-system connector 15. Though not shown in FIG. 1, if there are tubing ends that have been cut to fit the landscape format, they may be joined or terminated as shown in FIG. 12.

If multiple tubing/spacer arrays are needed to cover the lawn area to be watered, a second proximal lateral fluid conduit 20 may be connected to a first proximal lateral fluid conduit 20 and/or a second distal lateral fluid conduit 40 may be attached to the first distal lateral fluid conduit 40 and/or a second longitudinal fluid conduit 60 may be attached to the first longitudinal fluid conduit 60. The finished conformed irrigation unit is then covered with a few inches of soil, such as from 1.5 to 12 inches, but preferably from 2 to 4 inches.

Referring to FIG. 10, an exemplary installation method of the second embodiment of the irrigation system 10 will now be discussed. Four tubing/tubing arrays 51, 52, 53, 54, having a particular number of the longitudinal perforated tubing members 80 interwoven with a particular number of lateral perforated tubing members 100 are obtained. Though it is assumed in this description that the tubing/tubing arrays 51, 52, 53, 54 have been provided without lateral conduits 20, 40 or longitudinal conduit 60, optionally these may arrive from the fabricator or merchant pre-connected. The width of the tubing/tubing arrays 51, 52, 53, 54 may be determined by the width of the roll 13 available to the user.

The first tubing/tubing array 51 is placed on the ground in the area of the lawn to be watered. Any portions of the longitudinal tubing 80 or the lateral tubing 100 that extend over the edges of the landscape format (shown as lawn-edging 19 in FIG. 10) are cut. A first proximal lateral fluid conduit 20 is obtained, and the tubing proximal ends 81 of the longitudinal tubing members 80 are connected to it via tubing-to-lateral connector 30 (unless this connection is pre-connected by the manufacturer).

A longitudinal fluid conduit 60 and a distal lateral fluid conduit 40 are obtained. The first end of the longitudinal fluid conduit 60 is fluidly connected to a first end of the proximal lateral fluid conduit 20 via a first lateral-to-longitudinal connector, shown in FIG. 10 as a part of a four-way waterline-to-system connector 15. The second end of the longitudinal fluid conduit 60 is fluidly connected to a first end of the distal lateral fluid conduit 40 via the second lateral-to-longitudinal connector 75. The distal ends 89 of the longitudinal tubing members 80 are fluidly connected via tubing-to-lateral connectors 30 to distal lateral fluid conduit 40. The lateral tubing first ends 101 and second ends 109 are fluidly attached to the longitudinal fluid conduit 60.

Because in this example the provided first tubing/tubing array 51 is not long enough alone to cover the landscape format, the second tubing/tubing array 52 is positioned distally from the first tubing/tubing array 51. The tubing proximal ends 81 of this second tubing/tubing array 52 are connected to the distal lateral fluid conduit 40, but on the opposite side of the distal lateral fluid conduit 40 from the tubing distal ends 89 of the first tubing/tubing array 51. The distal ends 89 of the tubing 80 of the second tubing/tubing array 52 are cut to fit within the lawn-edging 19; these cut distal tubing ends 89 may be joined or terminated as shown in FIG. 12 or with one of the angled connectors of FIGS. 18-25, but are shown as joined by tubing joiner 88.

Additionally, a second longitudinal fluid conduit 60 is fluidly attached via a longitudinal-to-longitudinal connector 56 to the first longitudinal fluid conduit 60. The first ends 101 and second ends 109 of each of the multiple lateral perforated tubing members 100 of the second tubing/tubing array 52 are attached to the second longitudinal fluid conduit 60. The cut ends of middle portions 105 of the tubing 100 of the second tubing/tubing array 52 may be joined or terminated as shown in FIG. 11, joined with one of the angled connectors of FIGS. 18-25, or joined or terminated in any conventional manner.

Because the first tubing/tubing array 51 and the connected second tubing/tubing array 52 are not wide enough to cover the landscape format, the third and fourth tubing/tubing arrays 53, 54 are positioned laterally from the first and second tubing/tubing arrays 51, 52. Both of the third and fourth tubing/tubing arrays 53, 54 are inverted or flipped, with the first ends 101 and second ends 109 of each of the multiple lateral perforated tubing members 100 of the third and fourth tubing/tubing arrays 53, 54 attached to the opposing side of the first and second longitudinal fluid conduits 60. The conduits 20, 40, 60 may be terminated with terminal fittings 25, 65. Various other cuts, connections, joining, and terminations are made, as necessitated by the landscape format. In an instance (not shown) when the landscape format is wider or longer than the width of two of the provided tubing/tubing arrays, additional tubing/tubing arrays may be added laterally by extending the two proximal lateral fluid conduits 20 with one or more additional proximal lateral fluid conduits 20 or may be added longitudinally by extending the two longitudinal fluid conduits 60 with one or more additional longitudinal fluid conduits 60.

Figure 26:
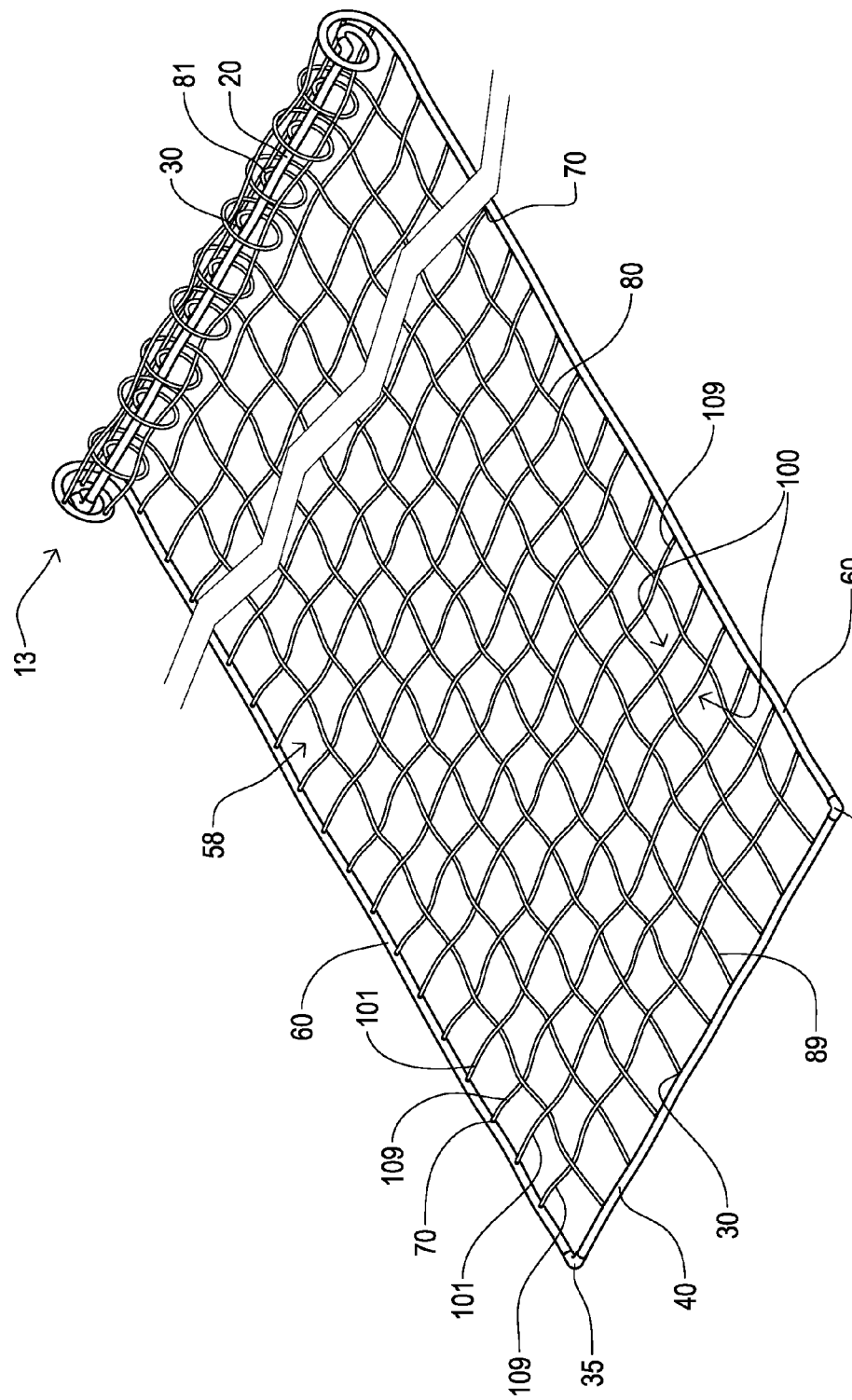
FIG. 26 is a perspective diagram of the sixth embodiment of the irrigation system of the present invention in roll 13 form (not to scale or at full width).

FIG. 26 illustrates a sixth embodiment of the sub-surface irrigation system 10 of the present invention. The sixth embodiment is similar to the second embodiment in that both create a woven grid-like pattern with redundant water supply provided to both the proximal end 81 (connected to a proximal lateral fluid conduit 20) and the distal end 89

(connected to distal lateral fluid conduit 40) of the longitudinal perforated tubing members 80. In both the sixth and second embodiments, the proximal lateral fluid conduit 20 is fluidly connected to a first (right or left) longitudinal fluid conduit 60, which is in turn fluidly connected to a distal lateral fluid conduit 40. In both embodiments, multiple lateral perforated tubing members 100 have both a first end 101 and a second end 109 and the first end 101 of each is connected to a first longitudinal fluid conduit 60. And in both embodiments, the lateral perforated tubing members 100 are interwoven with the longitudinal perforated tubing members 80 to create an integrated tubing/tubing array 58. The variations in the sixth embodiment, in contrast to the second embodiment, are that the sixth embodiment includes two (right and left) longitudinal fluid conduits 60 and that the second end 109 of each lateral perforated tubing member 100 is connected to the second longitudinal fluid conduit 60. Therefore, the water supply is doubly redundant with both ends of the lateral perforated tubing member 100 receiving water from a longitudinal fluid conduit 60, as well as both ends of longitudinal tubing members 80 receiving water. The two longitudinal fluid conduits 60 each have a proximal and distal end, which are connected to the proximal lateral fluid conduit 20 and to the distal lateral fluid conduit 40, respectively. The opposing right and left longitudinal fluid conduits 60 are disposed on opposite lateral sides of the tubing/tubing array 58.

In the integrated tubing/tubing array of FIG. 26, the first end 101 of each lateral perforated tubing member 100 is connected to the left longitudinal fluid conduit 60 and then the length of the lateral perforated tubing member 100 is interwoven alternately over and under each of the longitudinal perforated tubing members 80. When the lateral perforated tubing member 100 has been woven under or over the furthest longitudinal perforated tubing member 80, the second end 109 of the lateral perforated tubing member 100 is connected to the second longitudinal fluid conduit 60. Consequently, in the integrated tubing/tubing array 58 of the sixth embodiment, every lateral perforated tubing member 100 is woven alternately over and under the longitudinal perforated tubing members 80 and every longitudinal perforated tubing member 80 is woven alternately over and under the lateral perforated tubing members 100.

Figure 27:
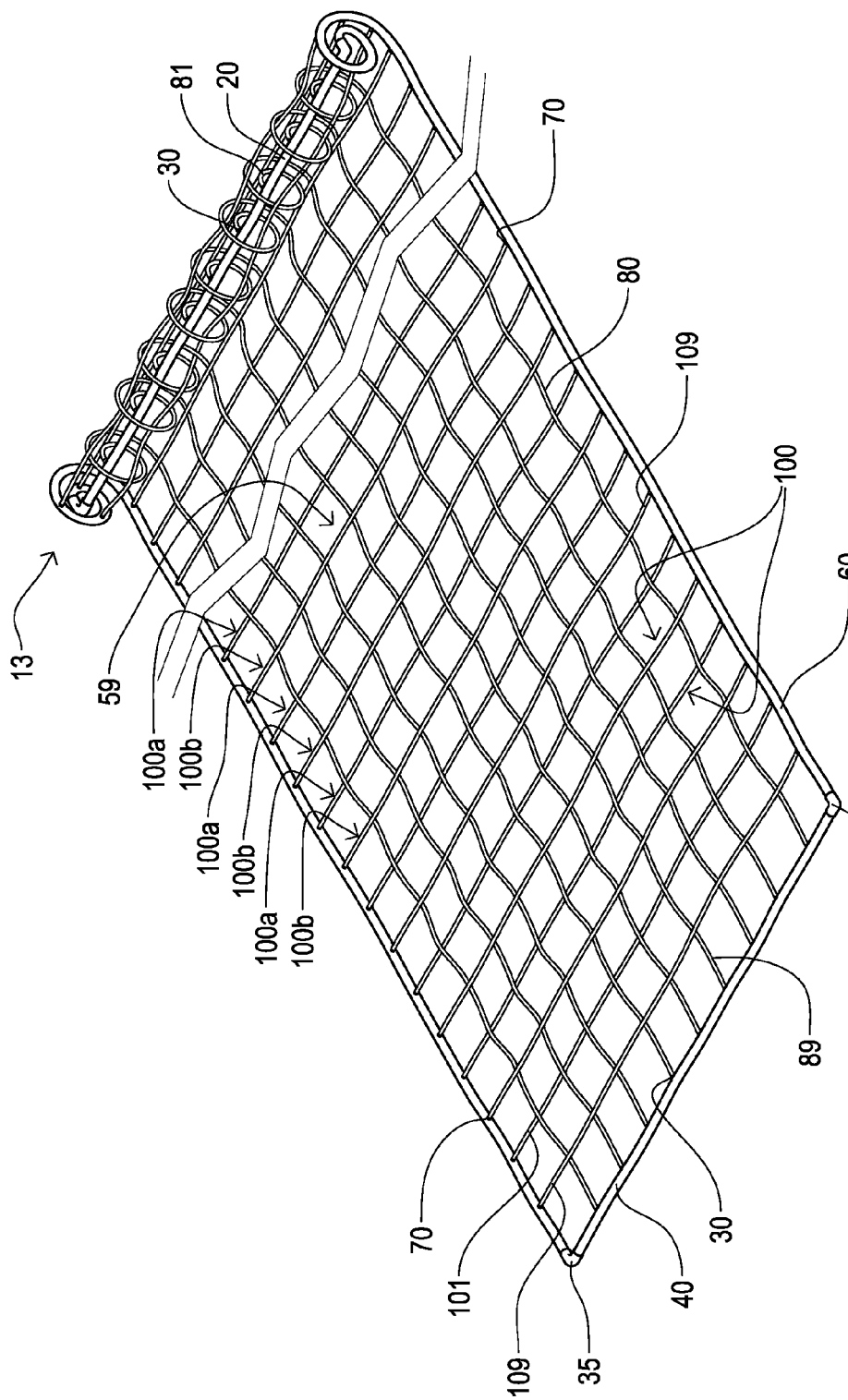
FIG. 27 is a perspective diagram of the seventh embodiment of the irrigation system of the present invention in roll 13 form (not to scale or at full width).

FIG. 27 illustrates a seventh embodiment of the sub-surface irrigation system 10 of the present invention, which includes the components and elements of the sixth embodiment, but differs in the manner of weaving. While the sixth embodiment has an integrated tubing/tubing array 58 in which every lateral perforated tubing member 100 is woven alternately over and under every longitudinal perforated tubing member 80, in contrast, the seventh embodiment has a transverse tubing/tubing array 59 in which some lateral perforated tubing members 100 are lower lateral perforated tubing members 100a positioned below all of the longitudinal perforated tubing members 80 and some are upper lateral perforated tubing members 100b positioned above all of the longitudinal perforated tubing members 80. Therefore, in place of the complete or integrated weaving of the previous embodiment, in the transverse-type weaving each of the lower tubing members 100a extends transversely across from the left to the right longitudinal fluid conduit 60 crossing entirely below the set of longitudinal members 80, and each of the upper tubing members 100b extends transversely across from the left to the right longitudinal fluid conduit 60 crossing entirely above the set of longitudinal members 80. For example, as shown, a first and all other odd members 100 may be lower tubing members 100a, and a second and all other even members 100 may be upper members 100b. Or, first and second members 100 may be lower members 100a and the third member or third and fourth members 100 may be upper members 100b, and so on and so forth. The style of weaving of the transverse tubing/tubing array 59 may provide advantages cost or in ease of manufacturing, yet still provides a sturdy grid, which is useful in shipping or installation.

As in the other embodiments, it is anticipated that the sixth and seventh embodiments will be sold in roll 13 form, which may be any length and/or width that is practical for manufacturing, transportation, shipping, and marketing. As in the other embodiments, it is anticipated that the width might be in the range of 8 to 16 feet, and that the length might be in the range of 25 to 100 feet.

In the invention, the proximal lateral fluid conduit 20, distal lateral fluid conduit 40, and longitudinal fluid conduit 60 are formed of flexible PVC pipe (preferably), rigid PVC pipe, metal pipe, tubing hose-like material, or other conventional irrigation pipe. If the longitudinal fluid conduit 60 is sold connected to the proximal lateral fluid conduit 20 and/or distal lateral fluid conduit 40, a flexible type of pipe will be needed if the system is to be transported in a roll 13 configuration.

The longitudinal and lateral perforated tubing members 80, 100 are preferably formed of a porous material that emits or seeps water along the length of the tubing members. A preferred type of tubing is the tubing generally referred to as "soaker hose" that allows the water to seep out through the tubing walls. However, other types of tubing with small holes allowing water to slowly discharge may optionally be used.

Though the irrigation system 10 has been discussed in relation to applying water to grassy areas, it also facilitates application of water-soluble weed preventers, fertilizers (man-made, natural, or organic), and other lawn treatments. A fitting can be installed upstream of the connection of waterline 16 to one of the conduits 20, 40, or 60 that allows introduction of a water-based lawn treatment, which will then be evenly distributed to the grassy area with the water application.

The sub-surface irrigation system 10 provides advantages such as the following: water is applied below the surface of the soil, thereby minimizing evaporation and runoff; water is applied to the base of the plant, keeping the leaves of the plants dry, thereby minimizing mildew; there are no above-ground sprinkler heads to break; the sub-surface application minimizes freezing danger; the sub-surface application eliminates wind spray and overspray; the system 10 is easy to install; and the system 10 is adaptable to any landscape format.

The invention illustratively disclosed herein suitably may be practiced in the absence of any element which is not specifically disclosed herein.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:
1. An irrigation tubing system, comprising:
multiple longitudinal perforated tubing members (80) each of which have a tubing proximal end (81) and a tubing distal end (89);

multiple lateral perforated tubing members (100) each of which have a tubing first end (101) and a tubing second end (109);
a proximal lateral fluid conduit (20) attached to each of said tubing proximal ends (81) of each of said multiple longitudinal perforated tubing members (80); and
a distal lateral fluid conduit (40) attached to said tubing distal ends (89) of each of said multiple longitudinal perforated tubing members (80);
a first and an opposing second longitudinal fluid conduit (60) each comprising a longitudinal conduit first end (61) attached to said proximal lateral fluid conduit (20) and a longitudinal conduit second end (69) attached to said distal lateral fluid conduit (40); wherein said tubing first ends (101) are attached to said first longitudinal fluid conduit (60); wherein said tubing second ends (109) are attached to said second longitudinal fluid conduit (60); wherein said multiple lateral perforated tubing members (100) are interwoven with said multiple longitudinal perforated tubing members (80).

2. The irrigation tubing system as recited in claim 1, wherein said multiple lateral perforated tubing members (100) are interwoven with said multiple longitudinal perforated tubing members (80) to form an integrated tubing/tubing array (58) wherein each of said multiple lateral perforated tubing members (100) is interwoven alternately over and under each of said multiple longitudinal perforated tubing members (80).

3. The irrigation tubing system as recited in claim 2, wherein:
each of said multiple longitudinal perforated tubing members (80) is disposed from 2 to 24 inches from an adjacent one of said multiple longitudinal perforated tubing members (80); and
each of said multiple lateral perforated tubing members (100) is disposed from 2 to 24 inches from an adjacent one of said multiple lateral perforated tubing members (100).

4. The irrigation tubing system as recited in claim 2, wherein:
each of said multiple longitudinal perforated tubing members (80) comprises a porous material that emits water; and
each of said multiple lateral perforated tubing members (100) comprises a porous material that emits water.

5. The irrigation tubing system as recited in claim 2, wherein said proximal lateral fluid conduit (20) comprises an internal axis around which said first and said opposing second longitudinal fluid conduits (60) with the attached said interwoven said multiple lateral perforated tubing members (100) and said multiple longitudinal perforated tubing members (80) are wound to form a generally cylindrical roll (13).

6. The irrigation tubing system as recited in claim 1, wherein said multiple lateral perforated tubing members (100) are interwoven with said multiple longitudinal perforated tubing members (80) to form a transverse tubing/tubing array (59) wherein a first one of said multiple lateral perforated tubing members (100) is positioned below all of said multiple longitudinal perforated tubing members (80); and wherein a second one of said multiple lateral perforated tubing members (100) is positioned above all of said multiple longitudinal perforated tubing members (80).

7. The irrigation tubing system as recited in claim 6, wherein:
each of said multiple longitudinal perforated tubing members (80) is disposed from 2 to 24 inches from an adjacent one of said multiple longitudinal perforated tubing members (80); and
each of said multiple lateral perforated tubing members (100) is disposed from 2 to 24 inches from an adjacent one of said multiple lateral perforated tubing members (100).

8. The irrigation tubing system as recited in claim 6, wherein:
each of said multiple longitudinal perforated tubing members (80) comprises a porous material that emits water; and
each of said multiple lateral perforated tubing members (100) comprises a porous material that emits water.

9. The irrigation tubing system as recited in claim 6, wherein said proximal lateral fluid conduit (20) comprises an internal axis around which said first and said opposing second longitudinal fluid conduits (60) with the attached said interwoven said multiple lateral perforated tubing members (100) and said multiple longitudinal perforated tubing members (80) are wound to form a generally cylindrical roll (13).

10. A method of assembling an irrigation tubing system, comprising:
obtaining multiple perforated longitudinal tubing members (80), each comprising a longitudinal tubing first end (81) and a longitudinal tubing distal end (89);
obtaining multiple lateral perforated lateral tubing members (100) each comprising a lateral tubing first end (101) and a lateral tubing second end (109);
obtaining a proximal lateral fluid conduit (20);
obtaining a distal lateral fluid conduit (40);
obtaining a first longitudinal fluid conduit (60);
obtaining a second longitudinal fluid conduit (60);
attaching said tubing first ends (81) to said proximal lateral fluid conduit (20) in a manner to allow fluid communication upon introduction of a fluid into said irrigation tubing system;
attaching said tubing distal ends (89) to said distal lateral fluid conduit (40) in a manner to allow fluid communication upon introduction of a fluid into said irrigation tubing system;
attaching said lateral tubing first ends (101) to said first longitudinal fluid conduit (60) in a manner to allow fluid communication upon introduction of a fluid into said irrigation tubing system; and
attaching said lateral tubing second ends (109) to said second longitudinal fluid conduit (60) in a manner to allow fluid communication upon introduction of a fluid into said irrigation tubing system; wherein said multiple lateral perforated lateral tubing members (100) and interwoven with said multiple perforated longitudinal tubing members (80) to create a tubing/tubing array (58, 59).

11. The method as recited in claim 10 wherein said tubing/tubing array (58, 59) comprises an integrated tubing/tubing array (58) wherein each of said multiple lateral perforated tubing members (100) is interwoven alternately over and under each of said multiple longitudinal perforated tubing members (80).

12. The method as recited in claim 11, wherein:
each of said multiple longitudinal perforated tubing members (80) is disposed from 2 to 24 inches from an adjacent one of said multiple longitudinal perforated tubing members (80); and each of said multiple lateral perforated tubing members (100) is disposed from 2 to 24 inches from an adjacent one of said multiple lateral perforated tubing members (100).

13. The method as recited in claim 11, wherein:
each of said multiple longitudinal perforated tubing members (80) comprises a porous material that emits water; and
each of said multiple lateral perforated tubing members (100) comprises a porous material that emits water.

14. The method as recited in claim 11, wherein said first longitudinal fluid conduit (60) and said second longitudinal fluid conduit (60) comprise flexible PVC pipe.

15. The method as recited in claim 11, wherein:
at least one of said multiple perforated longitudinal tubing members (80) or said multiple lateral perforated lateral tubing members (100) are cut to adjust said tubing/tubing array (58, 59) to fit a particular landscape format (19); and
at least one of said proximal lateral fluid conduit (20), said distal lateral fluid conduit (40), said first longitudinal fluid conduit (60), and said second longitudinal fluid conduit (60) are cut to adjust said tubing/tubing array (58, 59) to fit a particular landscape format (19).

16. The method as recited in claim 10 wherein said tubing/tubing array (58, 59) comprises a transverse tubing/tubing array (59) wherein a first one of said multiple lateral perforated tubing members (100) are positioned below all of said multiple longitudinal perforated tubing members (80); and wherein a second one of said multiple lateral perforated tubing members (100) are positioned above all of said multiple longitudinal perforated tubing members (80).

17. The method as recited in claim 16, wherein:
each of said multiple longitudinal perforated tubing members (80) is disposed from 2 to 24 inches from an adjacent one of said multiple longitudinal perforated tubing members (80); and
each of said multiple lateral perforated tubing members (100) is disposed from 2 to 24 inches from an adjacent one of said multiple lateral perforated tubing members (100).

18. The method as recited in claim 16, wherein:
each of said multiple longitudinal perforated tubing members (80) comprises a porous material that emits water; and
each of said multiple lateral perforated tubing members (100) comprises a porous material that emits water.

19. The method as recited in claim 16, wherein said first longitudinal fluid conduit (60) and said second longitudinal fluid conduit (60) comprise flexible PVC pipe.

20. The method as recited in claim 16, wherein:
at least one of said multiple perforated longitudinal tubing members (80) or said multiple lateral perforated lateral tubing members (100) are cut to adjust said tubing/tubing array (58, 59) to fit a particular landscape format (19); and
at least one of said proximal lateral fluid conduit (20), said distal lateral fluid conduit (40), said first longitudinal fluid conduit (60), and said second longitudinal fluid conduit (60) are cut to adjust said tubing/tubing array (58, 59) to fit a particular landscape format (19).

\* \* \* \* \*